Sept. 21, 1954 J. DE VEEN 2,689,425
FISHING-NET ADJUSTABLE AT VARIOUS DEPTHS
Filed Aug. 26, 1950
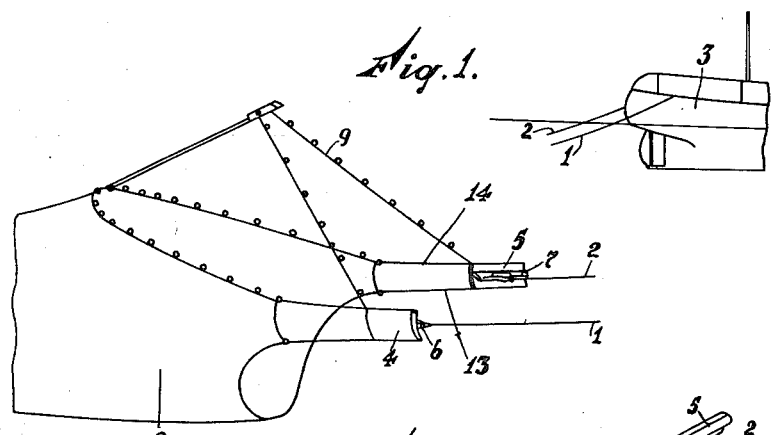
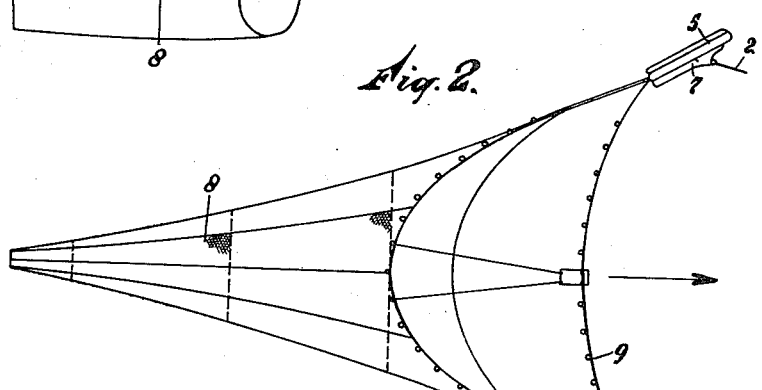
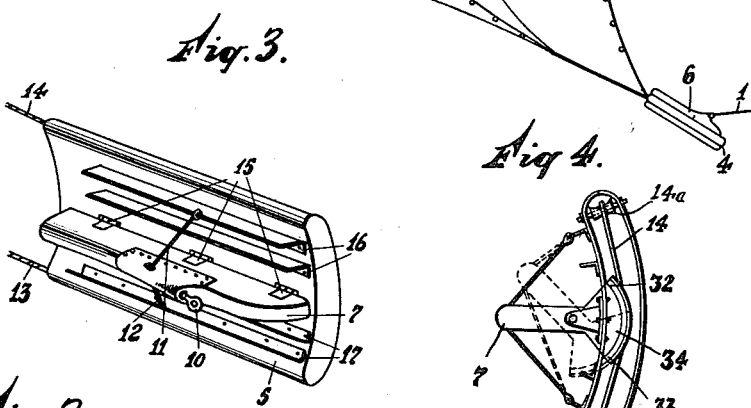
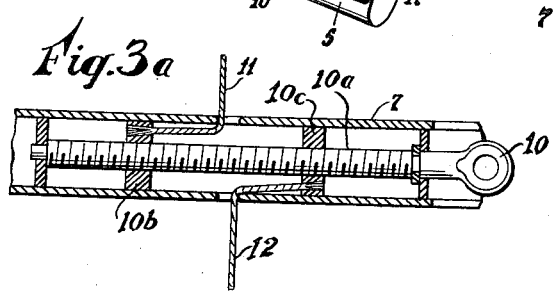
INVENTOR
JAN DE VEEN
BY Pollard and Johnston
ATTORNEYS Patented Sept. 21, 1954

2,689,425

UNITED STATES PATENT OFFICE 2,689,425

FISHING-NET ADJUSTABLE AT VARIOUS DEPTHS

Jan de Veen, The Hague, Netherlands, assignor to De Nederlandse Centrale Organisatie Voor Toegepast-Natuurwetenschappelijk Onderzoek, The Hague, Netherlands, a corporation of the Netherlands Application August 26, 1950, Serial No. 181,674

Claims priority, application Netherlands August 29, 1949

7 Claims. (Cl. 43—9)

This invention relates to fishing nets of the type provided with a pair of otterboards connected respectively with opposite sides of the mouth of the net and towed by lines extending from a ship, for holding the net open during fishing operations, and more particularly to such a net provided with otterboards having diving rudders by which the net can be steered during fishing operations so as to control accurately its depth in the sea.

It may be explained that if the mouth of a net has a normal height of about 5 metres, and the depth of the fishing-water is about 150 metres, neither a drift-net used at the surface of the water nor a trawl-net drawn along the bottom of the water, will be effective when a shoal of fish is at a depth between 5 and 145 metres.

It is an object of the invention to provide a fishing net of the type mentioned which can be steered to desired depths during trawling operations, from on board the ship towing it.

Another object of the invention is to provide such a net which can be steered by movement of its tow lines, such as by rotating one line connected with each otterboard or by relative longitudinal movement of two lines connected with each otterboard.

Still another object of the invention is to provide simple and durable otterboards for nets of the type mentioned, which comprise substantially vertical boards and generally horizontal diving rudders having hinge connections to the vertical boards, whereby the otterboards provide for efficient and accurate steering action but resist damage under the rough handling encountered in use.

A further object of the invention is to provide a drag net having otterboards which are adjustable from on board a ship during fishing so as to vary the lengths of two draglines which connect each otterboard with one side of the net, whereby easy trailing of the net may be assured.

The foregoing and other objects, features and advantages of this invention will be apparent from the following detailed description and the accompanying drawings of illustrative embodiments. In the drawings:

Fig. 1 shows a side elevation of the stern portion of a ship and a side view of part of a net provided with a pair of otterboards according to one embodiment of the invention;

Fig. 2 is a plan view of the net and otterboards shown in Fig. 1;

Fig. 3 is a perspective view of one of the otterboards;

Fig. 3a is a fragmentary longitudinal cross section through part of the structure of Fig. 3, showing a screw shaft and cable arrangement suitable for adjusting the angular position of the side wing relative to the vertical board of each otterboard;

Fig. 4 is an end elevation of the otterboard of Fig. 3, showing structures for moving draglines longitudinally relative to each other during adjustment of the side wing or diving rudder.

As shown in Figures 1 and 2, two tow lines 1 and 2 extend from opposite sides of a ship 3 and are attached respectively to the laterally extending side wings or diving rudders 6 and 7 of a pair of otterboards. Each otterboard drags one side of a fishing net 8 by means of two draglines 13 and 14. The navigation direction is indicated by the arrow in Figure 2. The usual floatline for keeping open the upper side of the net is indicated at 9.

Figure 3 shows the construction of each otterboard on an enlarged scale. It comprises an elongated, transversely curved, generally vertical board 5, to which a lateral rudder or side wing 7 of substantially planar form is secured, through hinge brackets 15, for swinging movement on an axis spaced from and substantially parallel to the longitudinal axis of board 5. The side wing is movable about this axis to assume any desired angular relation to the vertical board, and it constitutes a diving rudder because it extends from the vertical board towards the navigation direction of the ship during fishing operations, as will be evident from Fig. 2. Each otterboard is attached to one of the tow lines extending from the ship, at the eyebolt end 10 of a rotatable screw shaft 10a which is mounted in a leading part of the corresponding side wing 6 or 7, as seen in Fig. 3. The screw shaft carries a set of nuts 10b and 10c which are confined against rotation but are movable along the shaft within the side wing, and the inner ends of oppositely extending cables 11 and 12 are attached to these nuts, as indicated in Fig. 3a. The cables 11 and 12 pass through eyes in the upper and lower sides of each side wing from which they extend in opposite directions to fixed points of connection with upper and lower parts 16 and 17, respectively, on the inner side of the vertical board 4 or 5. It results that rotation of the screw shaft 10a in one direction shortens the reach of cable 11 and lengthens the reach of cable 12, thus raising the leading edge of the side wing relative to the vertical board, while the opposite rotation of the screw shaft lengthens the reach of cable 11 and shortens the reach of cable 12 so as to lower that edge. Any desired rotation of the screw shafts of the two otterboards can be effected from on board the towing ship by rotation of the tow lines 1 and 2, and in this manner the depth of the net 8 is readily controlled in the course of fishing operations so as to meet a school of fish at whatever depth it may be found.

In the form shown, the parts 16 and 17 anchoring cables 11 and 12 are substantially horizontal steering strips or ribs, several of which may be provided on each otterboard for stabilizing it and maintaining its equilibrium in the water.

As may be seen in Figure 4, the draglines 13 and 14 which connect each otterboard with a side of net 8 extend over pulleys 13a and 14a, respectively, which are mounted in lower and upper portions of the upright board. The two draglines then converge to points of connection at 32 and 33, respectively, with the arcuate face of a segment 34 which lies within the upright board and is fixed to the side wing or diving rudder for movement therewith. When the diving rudder is adjusted, the segment 34 is turned a corresponding distance about the rudder axis, and the lengths of the draglines 13 and 14 between the otterboard and the net are changed simultaneously. The relative lengths of the draglines can be adjusted in this manner so that the net will readily follow the course of the otterboards.

Since neither the depth reached by the trawl net at a given setting of the otterboards, nor the change of depth affected by an adjustment of the otterboards is always the same, being influenced by the speed of the ship, the strength and direction of water currents and the weight of the net, it is important that the diving net be operated while utilizing effective means for indicating its depth at any moment to a person or persons attending its operation from aboard the towing ship. For this purpose any suitable depth indicating means may be used; for example, a sounding device may be employed in association with the net assembly so as to generate depth indicating signals which may be transmitted through a tow line to the crew aboard the ship.

It will be evident that the foregoing description and the accompanying drawings are illustrative and that various changes, omissions and substitutions may be made in practical embodiment of the invention while still utilizing the new principles and features of construction herein disclosed and claimed.

I claim:

1. In a fishing net comprising a net body having a mouth and adapted to be drawn at controlled depths through fishing water, and a pair of otterboards respectively connected with opposite lateral sides of the net body to hold its mouth open as it moves in the water, said otterboards each comprising an upright board, a diving rudder connected therewith, the rudder in its normal position lying transverse to the upright board but being movable relative to said board about a hinge axis substantially parallel to the longitudinal axis of said upright board, to vary the operating depth of the net, and an adjustable positioning mechanism between the rudder and said board including means operable by at least one tow line for moving said rudder about said hinge axis to change the working position of the rudder.

2. In a fishing net comprising a net body having a mouth and adapted to be drawn at controlled depths through fishing water, and a pair of otterboards respectively connected with opposite lateral sides of the net body to hold its mouth open as it moves in the water, said otterboards each comprising an upright board, a diving rudder connected therewith, the rudder in its normal position lying transverse to the upright board but being movable relative to said board about a hinge axis substantially parallel to the longitudinal axis of said board, to vary the operating depth of the net, and an adjustable positioning mechanism between the rudder and said board including rotary means operable by rotation of a tow line for moving said rudder about said hinge axis to change the working position of the rudder.

3. In a fishing net comprising a net body having a mouth and adapted to be drawn at controlled depths through fishing water, and a pair of otterboards respectively connected with opposite lateral sides of the net body to hold its mouth open as it moves in the water, said otterboards each comprising an upright board, a diving rudder connected therewith, the rudder in its normal position lying transverse to the upright board but being movable relative to said board about a hinge axis substantially parallel to the longitudinal axis of said board, to vary the operating depth of the net, and an adjustable positioning mechanism between the rudder and said board including means operable by movement of at least one tow line for moving said rudder about said hinge axis to change the working position of the rudder, each otterboard being connected with the net body by a pair of draglines, and each otterboard comprising means operated upon a change of the position of its rudder relative to its upright board to vary the effective lengths of its draglines.

4. An otterboard for a fishing net having otterboards connected through draglines to opposite sides of the net and adapted to be drawn through fishing water by tow lines, comprising an upright board for holding open the mouth of the net, a substantially flat rudder in its normal position lying transverse to the upright board, means hingedly connecting said rudder with said board for movement of the rudder relative to the board about a hinge axis substantially parallel to the longitudinal axis of said board, and adjustable positioning means between said rudder and said board for moving said rudder about said hinge axis to change the angle between said board and said rudder.

5. An otterboard for a fishing net having otterboards connected through draglines to opposite sides of the net and adapted to be drawn through fishing water by tow lines, comprising an upright board for holding open the mouth of the net, a substantially flat rudder in its normal position lying transverse to the upright board, means hingedly connecting said rudder with said board for movement of the rudder about a hinge axis substantially parallel to the longitudinal axis of said board, and adjustable positioning means between said rudder and said board for moving said rudder about said hinge axis to change the angle between said board and said rudder, said positioning means comprising a tow line rotatable screw and elements positioned by rotation of said screw to change said angle.

6. An otterboard for a fishing net having otterboards each connected through a pair of draglines to opposite sides of the net and adapted to be drawn through fishing water by tow lines, comprising an upright board for holding open the mouth of the net, a substantially flat rudder in its normal position lying transverse to the upright board, means hingedly connecting said rudder with said board for movement of the rudder about a hinge axis substantially parallel to the longitudinal axis of said board, and adjustable positioning means between said rudder and said board including means operable by at least on tow line for moving said rudder about said hinge axis to change the working position of the rudder, said otterboard also comprising connections for the pair of draglines extending therefrom to the net and means operated upon movement of said rudders relative to said upright board to change the effective lengths of said draglines.

7. An otterboard comprising an elongated upright board, a substantially flat rudder in its normal position lying transverse to the upright board, means hingedly connecting the rudder with said board for movement of the rudder about a hinge axis substantially parallel to the longitudinal axis of said board, a screw shaft carried by a leading part of said rudder, a pair of spaced nuts threaded on said shaft and movable axially but non-rotatable thereon, a cable having one end secured to an upper portion of said board and its other end connected to one of said nuts, a second cable having one end secured to a lower portion of said board and its other end connected to the other of said nuts, and guide means for the respectice cables located between said nuts, so that rotation of said shaft changes the effective lengths of said cables and the angle between said rudder and said board.

References Cited in the file of this patent

UNITED STATES PATENTS

| Number | Name | Date |
|---|---|---|
| 40,028 | Ericsson | Sept. 22, 1863 |
| 331,133 | Hannay | Nov. 24, 1885 |
| 861,478 | Ottignon | July 30, 1907 |
| 1,255,034 | Mason | Jan. 29, 1918 |
| 1,683,668 | Hansen et al. | Sept. 11, 1928 |
| 1,842,634 | Symonds | Jan. 26, 1932 |
| 1,846,912 | Sedgley | Feb. 23, 1932 |
| 1,900,848 | Vadset | Mar. 7, 1933 |

FOREIGN PATENTS

| Number | Country | Date |
|---|---|---|
| 15,465 | Great Britain | 1903 |
| 143,226 | Great Britain | Apr. 14, 1921 |
| 906,665 | France | Jan. 16, 1946 |